Patented Apr. 6, 1943

2,316,039

UNITED STATES PATENT OFFICE 2,316,039

CEMENT COMPOSITION

Howard Raymond Wilson, Cleveland, Ohio, assignor to E. I. du Pont de Nemours & Company, Wilmington, Del., a corporation of Delaware No Drawing. Application April 4, 1940,
Serial No. 327,787

15 Claims. (Cl. 106—109)

This invention relates to the utilization of iron sulfate compounds and to the recovery of useful values from residues containing the same produced in various industrial processes. More particularly, it relates to the production of novel and useful compositions from said compounds, especially ferrous sulfates.

The by-product waste acid or pickle liquors produced in commercial operations, such as in the titanium pigment, steel, plating or like industries, contain relatively large quantities of acid, usually sulfuric, together with varying but equally large amounts of iron sulfates or other metallic compounds. In titanium oxide pigment production, for instance, titaniferous ores, such as ilmenite, are decomposed, usually by sulfuric acid attack, and a solution of titanium and iron sulfates produced in which the iron is preferably in the ferrous condition. Upon being hydrolyzed, said solution yields precipitated, hydrated titanium oxide, which, upon suitable purification and calcination, converts to the final anhydrous titanium oxide pigment. The residual liquor from hydrolysis contains substantial amounts of free sulfuric acid and ferrous sulfate. To recover as much of the free acid as possible for reuse or sale, said liquor is suitably concentrated by heating and evaporation, and, upon a desired saturation point being reached, is cooled to crystallize out the ferrous sulfate, enabling recovery of the acid. That portion of the acid which is too weak or contaminated for reuse as well as the crystallized sulfate or copperas is then discarded. Since these residues are corrosive or polluting in character and are produced in excessively large quantity, it is very difficult to dispose of them. As a consequence, they present a serious disposal problem in various industries.

I have found that iron sulfates, particularly those which are in the ferrous condition, may be employed as useful intermediates in the production of novel, high grade compositions of matter, and that, as a result, the problems peculiarly akin to their production can be effectively minimized or avoided altogether. Thus, I have found when dry, solid ferrous sulfate, especially in a controlled state of hydration, is suitably compounded or admixed with a dry, solid alkaline calcium compound, particularly calcium oxide, the resulting mixture comprises a relatively stable, cement composition readily adapted for many widely varying uses.

I am aware U. S. Patent 1,547,624 proposes to admix soluble iron compounds, such as ferrous sulfate (and from whatever source) with sodium carbonate and large quantities of water to produce a suspension of iron compound useful for purifying gases. Also, that U. S. Patent 2,165,344 proposes the precipitation of solids from ferrous sulfate containing waste pickle liquors by the addition of sufficient alkaline calcium compounds to such liquors, during accompanying agitation and boiling, as will neutralize the acid present and precipitate iron salts also present. However, neither patentee's process or product is directed to my invention, as will more readily appear from the ensuing description of my invention.

In carrying out the invention, a relatively dry mixture of solid iron sulfate, particularly ferrous sulfate, and a calcium compound, particularly calcium oxide or lime, is ground or pulverized to produce a relatively dry, impalpable, powdered final product. Alternatively, previously pulverized or powdered dry iron sulfate and a calcium compound, such as the oxide, hydroxide or carbonate, may be suitably mixed, intimate association thereof being effected by any convenient or desired method or means. Whatever the initial physical condition of the iron and calcium compounds, substantially equimolecular proportions thereof are used in making up said mixture. In the preferred adaptation of the invention the use of a slight excess of calcium compound over that theoretically required has proven very advantageous. Thus, in producing the desired mixture, I employ substantially 1 molar quantity of calcium oxide or lime to 1 or less than 1 molar quantity of ferrous sulfate.

In obtaining a product of increased stability for purposes of transportation or for storage in sealed containers over a prolonged period of time, and to avoid any deteriorating reaction occurring in the mixture, I control the amount of hydrate water present in the ferrous sulfate used, since I have found that when the water of hydration of the ferrous sulfate does not exceed an amount corresponding substantially to a dihydrate, a highly stable material results as a final product. Accordingly, the preferred stable composition of my invention comprises a powdered mixture of ferrous sulfate containing not in excess of 2 mols of hydrate water and an equimolecular quantity of powdered lime.

As will be evident, the stable, dry composition of my invention comprises a triturated mixture of mono or dihydrate ferrous sulfate and calcium oxide or hydrate. It consists of a premixed, quick-setting, cement composition which, upon being wet or admixed with a substantially equal weight of water, forms a plastic mass which undergoes, within a relatively short period of time and at room or ordinary temperatures, a setting reaction to produce a hard plaster or stone-like material, comprising gypsum and iron hydroxide, suitable for many widely varying uses. While no baking or special means for effecting drying of the plastic are required, it is apparent that drying to form slabs of molded plaster or otherwise may be accelerated readily by increasing the temperature of the surrounding atmosphere or by radiation from a suitable source of energy.

The cement compositions produced in accordance with my process will find useful application in making many articles of commerce, such as wall board, building tile for partitions, for heat insulation apparatus, and for any other structural use where strength, water resistance, fire resistance, and heat insulating qualities are required. Obviously, the usual variety of mineral fillers can be used in such instances to extend the plaster, provide bulk, porosity, and to increase drying time, to afford additional strength or to serve any other useful purpose ordinarily accomplished by the inclusion of fillers and aggregates such as clays, asbestos fiber, wood fiber, kieselguhr, bagasse fiber, silica, cinder, etc. Suitable coloring agents may be added to modify the light tan color of the plaster and waterproofing or sizing material or agents can be applied by well-known coating or impregnation operations.

To a more complete understanding of the invention and in illustration of one preferred embodiment thereof, involving the production of a stable, hydraulic cement composition, the following specific example is given, which, however, is not to be considered as in any wise limiting my invention:

Example I

Copperas was dried to constant weight at 110° C. forming a salt containing approximately 2 mols of water of hydration. The resulting dihydrate was then ground with an equimolecular quantity of lime to form a dry cement powder having the approximate composition:

|  | Per cent |
|---|---|
| Ferrous sulfate dihydrate | 77.5 |
| Calcium oxide | 22.5 |

The powdered material thus obtained was found to be stable after storing for 5 months in sealed containers. When substantially 100 parts of this cement composition were slurried to a wet paste with substantially 80 parts of water (insufficient to dissolve all the $FeSO_4$) a smooth, dark plaster was formed. A noticeable set occured within 5 minutes and in 24 hours the material had formed a firm, dry, light tan colored plaster having a hardness about equal to commercial gypsum products. The set and dried plaster so produced was substantially porous in nature, had a density of about 60 pounds per cubic foot, exhibited considerable crushing resistance, and was not subject to rapid disintegration by water.

As will be evident, my novel cement composition constitutes a distinct advance in the art of utilizing solid or crystalline residual or waste ferrous sulfate products, and may be obtained by a simple, direct and relatively cheap grinding operation. The final dry mixture of calcium oxide or hydrate and ferrous sulfate solid, as already noted, is relatively stable in characte and may be conveniently stored or transported so that at any time a moldable plaster may be prepared therefrom which is capable of quickly undergoing a setting reaction and of developing useful properties as a material of construction.

While a stable, deterioration-resistant cement powder comprises the preferred product from my invention, a composition of intermediate stability and in which more hydrate water is present can also be prepared therefrom, if desired, provided the resulting plaster is to be used near the point of grinding the higher hydrated ferrous sulfate and calcium oxide or lime materials. To illustrate this modification, the ensuing example involving the production of a ferrous sulfate heptahydrate-lime plaster is given. This example is likewise not to be construed as in limitation of my invention:

Example II

Substantially equimolar quantities of crystal ferrous sulfate heptahydrate and lump calcium oxide were added to a mortar and ground to an intimate mixture of small particles estimated roughly as 100 mesh size. A slight excess of calcium oxide over theoretical proportions is used to insure formation of an insoluble plaster when reacted with water. The color of the mixture increases from a light green to a dark green during grinding and a slight tendency toward packing and the evolution of heat indicates that a partial reaction takes place. The resulting triturated mixture had the following approximate composition:

|  | Per cent |
|---|---|
| Calcium oxide | 17.5 |
| $FeSO_4 \cdot 7H_2O$ (copperas) | 82.5 |

When a suitable quantity of water, about 30% of the weight of the solid, was added to this mixture, a smooth working plaster resulted. The resulting wet cement was then molded into a thin 1/8" slab and allowed to set. In 10–15 minutes a noticeable initial setting occurred and in one hour the material was quite hard, its color changing from a dark green to a brown. After 18 hours, the surface of the material was practically as hard as ordinary commercial gypsum tile products and when placed in water was not subject to ready disintegration.

If desired, the extent of reaction during grinding of the two materials together, as in Example II above, may be effectively controlled and retarded by conducting a larger part of the grinding to desired size separately on each of the materials, copperas and lime, and thereafter effecting mixing in the mortar accompanied by further grinding.

While the proportions of the ferrous sulfate compound and calcium oxide or lime used in preparing my hydraulic cement are substantially the equimolar ratio of quantities, and in the preferred adaptation the calcium oxide or hydroxide is present in slight excess, e. g., about 2–3% over the percentage of ferrous compound, it is obvious that a much larger excess of lime may be used, if desired, such excess undergoing a desired setting according to the usual reaction for lime plaster and forming an amount of say, calcium carbonate in the interstices of the other constituents in proportion to the excess employed, thereby imparting additional desired strength to the final product. Likewise, some excess lime as magnesia may be used in the form of dolomitic lime, or magnesia itself may be employed, if sufficient calcium oxide is present to insure combination with the sulfuric acid or ferrous sulfate to form hydrated calcium sulfate; otherwise, the more soluble and undesirable magnesium sulfate would be formed.

As already noted, ferrous sulfate comprises the preferred type of iron sulfate for use in my invention, although other forms of iron sulfates such as ferric sulfate may also be used. The ferrous sulfate used in the various modifications of my invention may be substantially anhydrous in character or it may contain up to 7 mols of hydrate water. The calcium compound or lime used may comprise either calcium oxide or hydrated lime or calcium carbonate. The limits of the amounts of water for dry solid mixtures comprise those corresponding to ferrous sulfate having substantially 7 mols of hydrate water used with calcium hydrate at one extreme and to ferrous sulfate monohydrate with calcium oxide as the lower, more desirable and practical limit of water content. As already stated, the stability of the dry ground mixtures increases with decrease in the amount of water present, an indefinitely stable mixture being obtained by having present approximately 2 mols or less of water for each mol of ferrous sulfate used. For working up into a plaster near the grinding operation, the lime can suitably comprise lime hydrate and copperas or ferrous sulfate heptahydrate satisfactorily employed in conjunction therewith. Copperas comprises the hydrated form in which ferrous sulfate is most readily recovered from residual sulfuric acid liquors. When copperas is employed as the starting material and procurance of a stable dry mix is desired, the same may be conveniently dried, as shown in Example I, to constant weight by heating to a suitable drying temperature to form the desired anhydrous, mono or dihydrate salt to be actually used in obtaining said mix. When ferrous sulfate is recovered from waste sulfuric acid or obtained as a by-product from titanium pigment production, any excess acid present in the salt may be neutralized with lime and the resulting neutralized hydrate may be then dried, ground and mixed with more lime to form my novel plaster powder.

The amount of water to be used in conjunction with my pre-mixed cement composition to form the final rigid product is variable and, usually, is only sufficient to effect desired, more or less complete wetting of the powdered mixture. When the ferrous sulfate present in the mix is not hydrated beyond the dihydrate, an amount of water substantially equal to the weight of the mix may be employed. When a less stable form of mix is being treated, e. g., wherein the ferrous sulfate present is hydrated beyond the dihydrate stage, a lesser amount of water may be used, say, about one-third the weight of the mix. Whatever the nature of the mix, however, I use sufficient water as will insure complete conversion of the alkaline calcium compound to gypsum during the ensuing setting reaction, and thus obtain a relatively plastic mass or plaster adapted to quickly stiffen, at ordinary temperatures and after desired molding, to a substantially rigid, uniform solid, exhibiting improved tensile strength, abrasion, heat and water resistance characteristics.

As already noted, my novel dry powder can be stored for indefinite periods and made ready for use as a plaster at any desired time, by simply mixing with water. Setting takes place without the necessity of oven drying. This is a definite advantage over prior products, which must be immediately formed into shape at their point of production and while in the wet, precipitated state, setting thereof being effected by oven or other heat drying. Also, my invention enables the utilization of solid copperas or ferrous sulfate solid in the form of cement and through the medium of a process which involves but a single step, and economical, direct dry grinding of lime and ferrous sulfate in one piece of equipment. It also provides a process in which the stability of the cement powder and storage or transportation to a point of use removed from the place of grinding can be desirably regulated and through control of the hydrate water content of the ferrous sulfate and lime used. Further, it will be obvious that the handling of the dense, free-flowing powder is more convenient and economical than transportation or storage of a wet precipitate or bulky, fluffy ground precipitate.

In addition to other improved characteristics over prior products, my novel composition develops greater strength by reason of the initial setting reaction afforded by my invention. This is particularly notable upon comparison with products obtained by precipitating calcium sulfate and iron hydroxide by calcium compound addition to waste acid liquor with accompanying boiling of the mixture and subsequent pressing and drying of the final precipitate at elevated temperatures. Also, my final product comprises a gypsum-iron hydroxide composition in which the calcium sulfate component is substantially completely hydrated, whereas a product from the process just referred to may contain more or less dehydrated or anhydrous calcium sulfate. Thus, it is recognized (U. S. Patent 2,151,331) that calcium sulfate dehydration and conversion to anhydrite occurs when calcium sulfate, and especially a low hydrated or soluble anhydrite form thereof, becomes subjected to boiling in aqueous media or in the presence of an added electrolyte. Again, by use of the above mentioned alkaline calcium compounds, it will be found that the plasters and final rigid compositions formed from cement mixtures containing said calcium compounds and ferrous sulfate, are relatively stable in nature and remain relatively unaffected by water due to the substantial absence therefrom of contaminating soluble alkali metal salts. Thus, when sodium, potassium, or like alkali metal compounds, such as sodium carbonate, are employed in conjunction with ferrous sulfate, the plasters formed therefrom readily disintegrate upon being contacted with water, such disintegration arising by reason of the presence of sodium sulfate or other soluble alkali salts in the final product.

I claim as my invention:

1. A process for producing a relatively stable cement composition comprising intimately associating together and in only substantially equi-molecular proportions relatively dry, finely-divided iron sulfate containing 1 to 7 mols of hydrate water and an alkaline calcium compound from the group consisting of calcium oxide, calcium hydroxide and calcium carbonate.

2. A process for producing a relatively stable cement composition comprising disintegrating in relatively dry condition a mixture in substantially chemically equivalent quantities only of an alkaline calcium compound from the group consisting of calcium oxide, calcium hydroxide and calcium carbonate and iron sulfate containing from 1 to 7 mols of hydrate water.

3. A process for producing a relatively stable cement composition adapted to set upon wetting with water, comprising dry grinding a mixture in only substantially equimolecular proportions of an alkaline calcium compound from the group consisting of calcium oxide, calcium hydroxide and calcium carbonate and ferrous sulfate containing from 1 to 7 mols of hydrate water.

4. A process for producing a relatively stable cement composition comprising dry grinding in only equimolecular proportions a mixture of an alkaline calcium compound from the group consisting of calcium oxide, calcium hydroxide and calcium carbonate and ferrous sulfate, the stage of hydration of the latter ranging from the mono to the dihydrate.

5. A process for producing a stable cement composition comprising pulverizing in dry condition a substantially equimolecular quantity only of calcium oxide and ferrous sulfate dihydrate.

6. A process for producing a stable cement composition comprising pulverizing in dry condition a substantially equimolecular quantity only of calcium oxide and ferrous sulfate monohydrate.

7. As a new, relatively stable cement composition, a substantially dry mixture of an alkaline calcium compound from the group consisting of calcium oxide, calcium hydroxide and calcium carbonate and iron sulfate containing from 1 to 7 mols of hydrate water, said calcium compound and iron sulfate being present in only substantially chemically equivalent quantities.

8. As a new cement composition, a substantially stable, dry, finely-divided, unreacted equimolar mixture only of an alkaline calcium compound from the group consisting of calcium oxide, calcium hydroxide and calcium carbonate and ferrous sulfate containing from 1 to 7 mols of hydrate water.

9. As a stable, cement composition, an equimolar mixture only of finely-divided, relatively dry alkaline calcium compound from the group consisting of calcium oxide, calcium hydroxide and calcium carbonate and ferrous sulfate, the latter being from the group consisting of the mono and dihydrate.

10. A stable cement composition comprising a dry, finely-divided, mixture of lime and ferrous sulfate dihydrate, said lime and ferrous sulfate being present in only substantially chemically equivalent quantities.

11. A stable cement composition comprising a dry, finely-divided equimolecular mixture only of lime and ferrous sulfate monohydrate.

12. A stable cement composition comprising an intimate mixture of finely-divided, dry lime and ferrous sulfate containing from 1 to 7 mols of hydrate water, said lime and ferrous compound being present only in substantially equimolecular proportions.

13. A stable cement composition comprising a finely-divided, triturated mixture of an alkaline calcium compound from the group consisting of calcium oxide, calcium hydroxide and calcium carbonate and hydrated iron sulfate containing not in excess of 2 mols of hydrate water, the amount of said calcium compound being not more than about 3% in excess over the amount of iron sulfate present.

14. A stable cement composition comprising a relatively dry, impalpable, powdered mixture of an alkaline calcium compound from the group consisting of calcium oxide, calcium hydroxide and calcium carbonate and iron sulfate containing not in excess of 2 mols of hydrate water, the amount of calcium compound present being from 2 to 3% in excess over the amount of iron sulfate present.

15. A stable, dry cement composition adapted to quickly set after being admixed with a substantially equal weight of water comprising a triturated mixture of ferrous sulfate containing from 1 to 2 mols of hydrate water, and an alkaline calcium compound from the group consisting of calcium oxide, calcium hydroxide and calcium carbonate, the amount of calcium compound present being from about 2 to 3% in excess over the amount of ferrous sulfate present.

HOWARD RAYMOND WILSON.

CERTIFICATE OF CORRECTION.

Patent No. 2,316,039. April 6, 1943.

HOWARD RAYMOND WILSON.

It is hereby certified that error appears in the printed specification of the above numbered patent requiring correction as follows: Page 4, second column, line 30, claim 14, before "iron" insert --hydrated--; line 32, before "from" insert --in slight excess of and not above--; line 33, same claim, strike out "in excess"; line 38, claim 15, before "ferrous" insert --hydrated--; line 43, same claim, before "from" insert --in slight excess of and not above--; same line, strike out "in excess"; and that the said Letters Patent should be read with this correction therein that the same may conform to the record of the case in the Patent Office.

Signed and sealed this 8th day of June, A. D. 1943.

(Seal)

Henry Van Arsdale,
Acting Commissioner of Patents.